Aug. 8, 1944.   K. W. NEBEL   2,355,320
METAL CUTTING SHEAR
Filed May 21, 1942   2 Sheets-Sheet 1
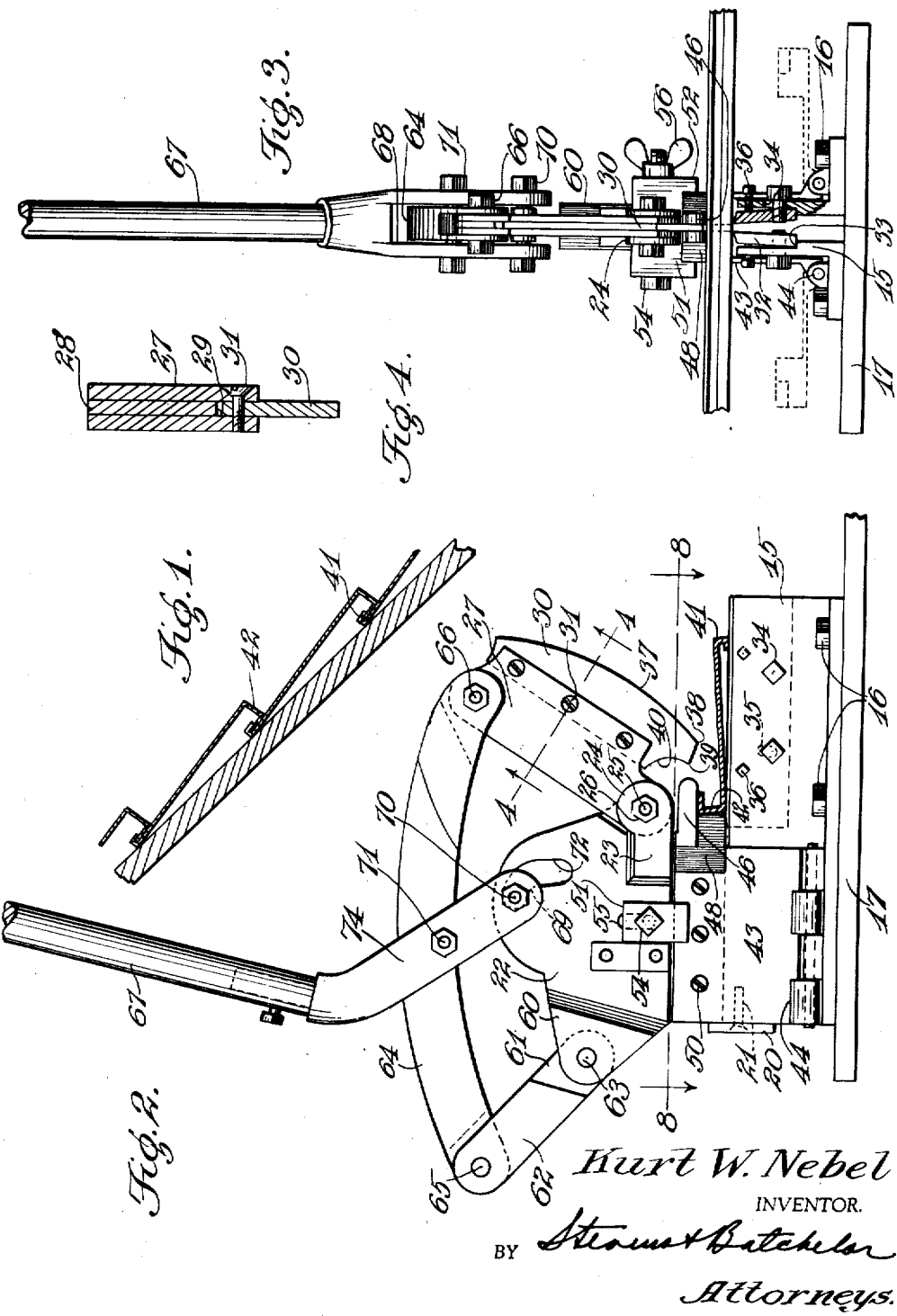
Kurt W. Nebel
INVENTOR.
BY Stearns & Batchelor
Attorneys.

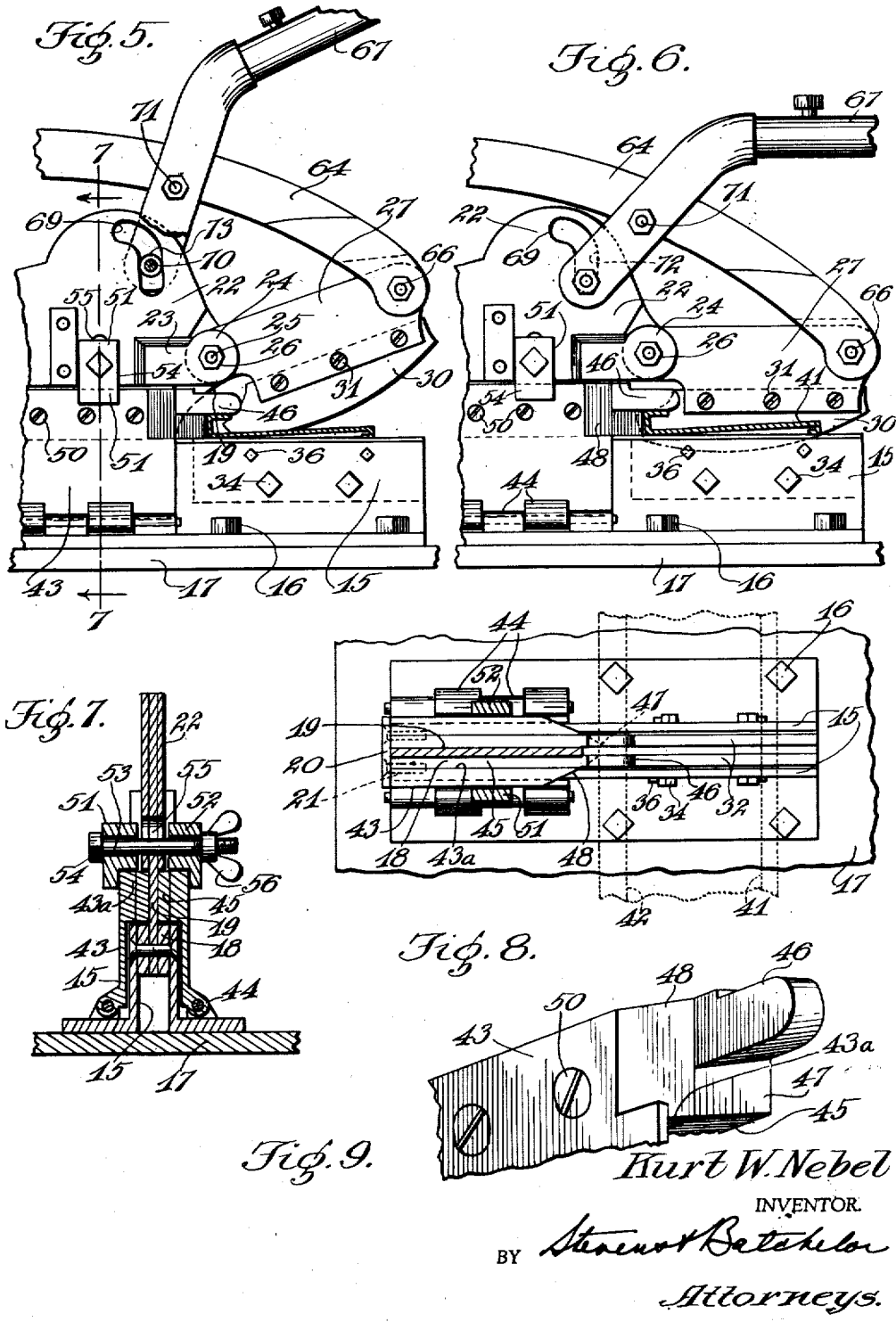

Patented Aug. 8, 1944

2,355,320

UNITED STATES PATENT OFFICE 2,355,320

METAL-CUTTING SHEAR

Kurt W. Nebel, Chicago, Ill.

Application May 21, 1942, Serial No. 443,959

9 Claims. (Cl. 164—44)

My invention relates to metal cutting shears, and particularly to that type which is changeable and adaptable to serve different kinds of work, and or adaptable to serve different kinds of work, and my main object is to provide a shear of this kind which is both useful for ordinary sheet metal cutting and for cutting metal siding or shingles employed in roofing.

A further object of the invention is to provide a shear of the above character which is completely designed and easily portable.

Another object of the invention is to construct a shear with a unique linkage for the transmission of hand power to operate the shear with a favorable leverage and convenient reach.

An additional object of the invention is to mount the portion designed for converting the shear to a siding cutter in a manner to be both firm when used for that function and movable out of the way when the shear is used for ordinary cutting.

An important object of the invention is to construct the same with values conductive to smooth and accurate operation, as well as with parts that are few and strong, rendering the shear durable over a long period of use.

With the above objects in view, and any others which may suggest themselves from the description to follow, a better understanding of the invention may be had by reference to the accompanying drawings, in which—

Figure 1 is a section of a roof showing the metal siding and its application;

Fig. 2 is a side elevation of the shear as employed for the siding cutting operation, the shear being in the open or retracted position;

Fig. 3 is a front elevation of the shear as seen in Fig. 2;

Fig. 4 is an enlarged section on the line 4—4 of Fig. 2;

Fig. 5 is a view similar to Fig. 2, showing the position of the shear at the inception of its cut;

Fig. 6 is a similar view, showing the position of the shear at the completion of its cut;

Fig. 7 is a section on the line 7—7 of Fig. 5;

Fig. 8 is a section on the line 8—8 of Fig. 2; and

Fig. 9 is a magnified fragmental view in perspective of a die employed for the siding cutting operation.

Referring specifically to the drawings, 15 denotes a pair of angle bars serving as the base of the shear, such bars being placed in spaced back-to-back relation, and with their bottom flanges perforated to receive bolts 16 to secure the base on a suitable support 17 which may be portable or form part of a table or bench.

The base bars 15 receive spacers 18 inwardly of their rear portions; and the spacers adjoin a vertical plate 19 which rises from the base to form the throat of the shear. The group of base bars, the spacers and the plate 19, is primarily secured by cross rivets or welding; and the assembly is additionally reinforced by the application of a rear end plate 20 with screws 21 driven into the respective base bars.

The throat plate 19 is thickened on both sides some distance above the base 15 to form a heavy frame 22 for the motive mechanism of the shear. The frame 22 is additionally thickened in front, as indicated at 23, to define a pair of ears 24 which are perforated crosswise to receive a bolt 25 from one side, and a nut 26 for the bolt from the other side. Between the ears 24, the bolt 25 serves as a pivot for a cleaver-like headpiece 27. The throat plate 19 is extended forwardly to form a third ear between the ears 24; and the headpiece 27 is in the form of a pair of plates which enter between the central and outer ears to receive their pivotal support on the bolt 25, so that the foundation of the headpiece is thus reinforced.

As indicated in Fig. 4, the walls of the headpiece 27 receive a spacer plate 28 between them, the assembly being secured by rivets or welding. The spacer plate 28 is in the upper portion of the headpiece, leaving a slot 29 in the lower portion thereof. A blade 30 is fitted in the slot 29 and secured by cross screws 31 in the walls of the headpiece. While the screws 31 serve as securing means for ordinary purposes, the insert 23 of the headpiece serves as a backing for the blade 30, so that undue cutting pressure on the same will not have a tendency to shear the screws 31. Also, the blade is held in the headpiece with a vise-like grip and an equal support on both sides, preventing distortion of the blade during the cutting action.

The headpiece 27 is intended to be swung down from the position of Fig. 2 to that of Fig. 6 in order to impart a cut to a sheet of metal or other material laid on the base 15. In order that the cut may be defined, however, a pair of lower blades 32 are provided inwardly of the base bars 15. As noted in Fig. 3, these bars are formed with shoulders 33 to provide rests for the blades 32. However, the latter are secured at their lower portions by means of bolts 34 passed through the bars and threaded into the respective blades 32, the bars having upwardly elongated openings 35 where the bolts pass in order to provide upward adjustments for the blades 32, so that sharpening wear is compensated. The blades converge upwardly to a spacing designed to closely receive the upper blade 30 as the same is swung in the manner previously described. Such upper blade has a flat edge, as indicated in Figs. 3 and 4, and the cut will therefore force a narrow ribbon of the sheet material down into the space between the lower blades 32. The downward spread of these will thus provide a clearance for the easy fall or drop of the said ribbon of material into the wider space in the lower portion of the base for easy removal. The vertical adjustment of the blade 32 is set by the insertion of shims under the blades before the bolts 34 are again tightened.

The spacing of the lower blades 32 is more accurately controlled by the threading of set screws 36 into the sides of the base 15 to bear against the respective blades 32 to the proper extent. Also, in order that the cut may be sharp, the lower blades are beveled outwardly from their inner edges at the top, so as to lend acute form to such edges and have them act as knives in co-operation with the upper blade 30.

Insofar as described, the shear is capable of receiving metal from the front to be severed as explained; and the throat plate 19 is made somewhat thinner than the upper blade 30 in order that the divided work may be fed rearwardly on both sides of the throat plate after each cut is taken, enabling work which is longer than the blades to proceed through the shear indefinitely without interference or having to be curved or bent from its regular level.

Obviously, the cut of the blade 30 commences when its edge 37 meets the work, and it stands to reason that the same must be forward of the lower end of such edge in order that the blade may assume the cut. Thus, the rear end of the blade has an obtuse point 38 at the bottom and a more pronounced point 39 defining a reduction 40 of the blade from the top.

The type of metal siding under consideration is illustrated in Fig. 1, and a length of siding is deposited on the base of the shear in the position indicated in Fig. 2, and by dotted lines in Fig. 8, when the length is to be cut in two. Ordinarily, the smaller channel 41 of the work does not become deformed when it is cut by a blade or saw; however, the larger channel 42 being more flexible, it is easily deformable when strain is put on it, so that the length of siding cannot be properly fitted when laid. The blade 30 has thus been specially designed to co-operate with a set of dies carried by the present shear in a manner to so treat the work when the cut is imposed that no deformation of the work can take place.

In carrying out the purpose just outlined, the base of the shear receives a pair of side plates 43 below the frame 22. These plates are attached to the base by means of bottom hinges 44, so that they may be swung from the vertical positions denoted by full lines to the dotted-line positions of Fig. 3.

Each side plate 43 is thickened inwardly as indicated at 43a; and the thickened portion is lined by a steel die 45 having a forward finger 46 in its upper portion and a beveled chisel-pointed portion 47 underneath, the plate 43 having its front edge made with a bevel 48 in continuation of the bevel 47, as clearly shown in Fig. 9. The die 45 is secured to the plate 43 by means of screws 50, so that the die may be removed for sharpening or replacement.

When the side plates just described are closed upon the sides of the base 15, the dies 45 lie against the faces of the throat plate 19; and the assemblies are so held by a clamp composed of two blocks 51 and 52. As indicated in Fig. 7, each of these blocks is L-shaped to overlap the related angle plate 43; and the blocks are bored in registration, as indicated at 53, for the application of a bolt 54 from one side, and through a slot 55 in the frame 22 to the other side, where a wing nut 56 is threaded on the bolt to complete the clamp. The shear is now ready for cutting siding. However, when no such work is present and ordinary sheet metal cutting is desired, it is only necessary to remove the clamp formed by the parts 51, 52, etc., in which event the side plates are free to be separated from the center of the shear and thrown back to the dotted-line position of Fig. 3 to be entirely out of the way.

When the cutting of a length of siding is to be negotiated with the work laid as in Fig. 2, it will be apparent that the base 15, chisel points 47 and fingers 46 form a pocket for the larger channel 42 of the work to confine the same to its true form. Thus, the inception of the cut, as indicated in Fig. 5, first pins the work down with the blade point 38, and on the rearward advance of the blade packs the larger channel 42 into the said pocket and hooks the upper flange of the channel as shown. Thus, there is no tendency to compress or collapse the channel; and as the blade continues to descend, it performs both its regular shearing cut on the bottom and forward portions of the work and its piercing cut through the channel 42, whereby to sever the entire section in the manner indicated in Fig. 6. Thus, the chisel points 47 act as anvils in conjunction with the pointed end of the blade to make the cut close and sharp, such chisel points serving to all intents and purposes as blades complementary to the working blade 30. Also, the receding faces 47, 48 of the said anvils enable the work to be set on a bias either way, if an oblique cut is desired.

A unique operating mechanism is provided for the cutter 27 in order that its manual control may not require undue effort. Thus, the frame 22 is extended rearwardly with spaced wings 60 which receive between them the lower portion 61 of a link 62, the portion 61 making a pivot joint 63 in the wings 60. The link 62 rises in a rearward direction and its upper portion is divided to receive the rear end portion of a longitudinal beam 64 between the link divisions, the beam being pivotally connected at 65 to the link. The beam makes a pivotal connection 66 at its forward end with the upper end of the headpiece 27.

The operating lever of the shear is indicated at 67, and its lower portion is bifurcated, as indicated at 68, to straddle the beam 64 and the frame 22, the latter having an opening 69 for the passage of a bolt 70 to pivotally connect the lever with the frame. A bolt 71 also makes a pivotal connection between the lever and the beam 64.

Primarily, the arrangement of the link 62 and the beam 64 helps to aline the headpiece 27 with the lever 67 and steady the headpiece against lateral deviation when the cutting pressure is heavy. However, the link and beam have a more important purpose from the operative point of view, particularly in connection with the passage 69 in which the pivoting bolt 70 is seated, through the extension of such passage with a downwardly-curved portion 72. The bolt is intended to descend or shift into the portion 72 as the lever 67 is drawn forward to operate the shear; and the bolt is provided with a roller 73 to ease its travel in the passage.

The lever 67 has an initial leverage advantage by being made approximately twice as long as shown in Fig. 2. And a comparison of the actuating radius—between the bolts 70 and 71—with the blade radius—between the bolts 25 and 66—indicates that the blades travels at a faster rate than the lever. However, the lever is not alined with its base portion 74, as to so extend it would place it too far back for a handy reach. On the other hand, having the lever deflected to the substantially vertical position shown, and the pivot at 70 stationary, would mean a forward travel of the lever to a very low level to finish the cut, requiring an unnatural stoop or extra exertion on the part of the operator. The curved passage drop 72 is therefore provided as a cam to move the bottom of the lever forward on descent and thus prevent the excessive clockwise rotation of the lever on the bolt 71. At the same time the provision of the link 62 controls the height of the beam 64 for the support of the lever in respect to the passage 69, in order that the travel of the bolt 70 in the same may be uniform and positively controlled. A power leverage is thus obtained, with a movement by the lever 67 of less than a quarter-turn to accomplish the complete cut, as is evident from Figs. 2 and 6.

It will be evident from the above description that I have provided a light, portable shear which is useful for both plain cutting work and the special operation of cutting sheet metal siding. The throat plate is in the nature of a backbone for the structure when used in either capacity. Thus, for ordinary cutting the strain is mainly on the base, and the throat plate is sufficiently reinforced by the base and the frame 22. However, when siding is being cut, the strain is both on the base and rearwardly on the throat plate with a tendency to spring or buckle the same. In this instance the side plates 43 not only serve as die supports but as reinforcing walls for the throat plate to help resist the rearward strain. The hinged mounting of these plates fixes their positions accurately and without the necessity of adjustment when they are closed against the throat plate; and when the plates are locked by securing the clamp 51, 52, it may be assumed without any doubt that the fingers 46 and chisel points 47 are accurately spaced to form anvils for the top and back of the work channel 42 for co-operation with the blade 30. A further reinforcement for the side plates is provided by making the rear end plate 20 long enough to overlap the rear ends of the side plates, so that backing strain on these is resisted by the plate 20. Further, an actuating linkage is provided for the cutter which is balanced, convenient, powerful and easy to operate, so that it is possible to get work cut by manual power in a small and portable shear which usually has to be cut in a large machine or press. Finally, while the novel shear does the work of a machine, it is built of few and simple parts so assembled as to be both light and strong and employ a minimum of material in its construction.

While I have described the improved shear along specific lines, it is apparent that minor changes and refinements may be made therein without departing from its principle, and I desire to consider all such changes and refinements as coming within the scope and spirit of the appended claims.

I claim:

1. A metal cutting shear comprising a base, a frame rising from the same, a square-edged blade pivoted in the frame and swingable in a vertical plane relative to the base, and companion stationary blades carried by said base and spaced to receive the pivoted blade slidingly between them on the downswing thereof, the work being supported on said stationary blades, and said frame including a throat plate in the advancing path of the work as severed by the shear, said throat plate being thinner than said blade to provide a clearance for the advancing feed of the work through the shear.

2. A metal cutting shear comprising a base, a frame rising from the same, a square-edged blade pivoted forwardly in the frame and swingable in a vertical plane toward the base, such blade having its rear end extended to be below the level of the pivot when the blade is in the initial position, a pair of dies rising from the base and slidingly receiving said rear end between them on its downswing for the shearing of work placed in front of said dies, and overhead forward extensions of the latter to cooperate with the base in forming seats for top and bottom extensions of said work.

3. A metal cutting shear comprising a base, a frame rising from the same, a square-edged blade pivoted forwardly in the frame and swingable in a vertical plane toward the base, such blade having its rear end extended to be below the level of the pivot when the blade is in the initial position, and a pair of dies rising from the base and slidingly receiving said rear end between them on its downswing for the shearing of work placed in front of said dies, said frame being formed as a throat plate above the base receiving said dies along opposite sides, and means to render said dies outwardly movable to clear the space alongside said throat plate.

4. A metal cutting shear comprising a base, a frame rising from the same, a square-edged blade pivoted forwardly in the frame and swingable in a vertical plane toward the base, such blade having its rear end extended to be below the level of the pivot when the blade is in the initial position, and a pair of dies rising from the base and slidingly receiving said rear end between them on its downswing for the shearing of work placed in front of said dies, said frame being formed as a throat plate above the base receiving said dies along opposite sides, and means to pivot said dies at the bottom whereby to render them outwardly movable to clear the space alongside said throat plate.

5. A metal cutting shear comprising a base, a frame rising from the same, a square-edged blade pivoted forwardly in the frame and swingable in a vertical plane toward the base, such blade having its rear end extended to be below the level of the pivot when the blade is in the initial position, and a pair of dies rising from the base and slidingly receiving said rear end between them on its downswing for the shearing of work placed in front of said dies, said frame being formed as a throat plate above the base receiving said dies along opposite sides, means to render said dies outwardly movable to clear the space alongside said throat plate, and clamps directed from the frame to said dies to secure them to the throat plate when they are normally positioned against the same.

6. A metal cutting shear comprising a base, a frame rising from the same, a square-edged blade pivoted forwardly in the frame and swingable in a vertical plane toward the base, such blade having its rear end extended to be below the level of the pivot when the blade is in the initial position, and a pair of dies rising from the base and slidingly receiving said rear end between them on its downswing for the shearing of work placed in front of said dies, the receiving ends of said dies being laterally deflected from their inner faces to provide oblique surfaces for seating work to be cut on a bias.

7. A metal cutting shear comprising a base, a frame rising from the same, a square-edged blade pivoted forwardly in the frame and swingable in a vertical plane toward the base, a pair of stationary blades in the base and spaced to receive the pivoted blade slidingly between them on the downswing thereof, the rear end of the blade being extended to be below the level of the pivot when the blade is in the initial position, and such rear end having rear and bottom points, a pair of dies rising from the base alongside the path of said rear end, and overhead forward extensions of said dies, whereby a piece of channel work may be lodged with one flange upon said stationary blades the other flange under said forward extensions and the bottom against said dies, and said points being located in positions for the bottom one to pin and slit said first-mentioned flange and the rear one to slit said other flange and pierce said bottom on the downswing of the blade.

8. A metal cutting shear comprising a base, a frame rising from the same, a square-edged blade pivoted in the frame and swingable in a vertical plane relative to the base, and companion stationary blades carried by said base and spaced to receive the pivoted blade slidingly between them on the downswing thereof, the base having walls receiving said stationary blades and formed with bottom supports on which said stationary blades are rockable to gather the upper portions thereof, and set screws directed from said walls against said upper portions to check their separation when so gathered.

9. A metal cutting shear comprising a base, a frame rising from the same, a square-edged blade pivoted in the frame and swingable in a vertical plane relative to the base, and companion stationary blades carried by the pivoted blade slidingly between them on the downswing thereof, the base providing bottom supports on which said stationary blades are rockable to gather the upper portions thereof, means for retaining the lower portions of the blades to the supports, and other means directed to said upper portions to check their separation when so gathered.

KURT W. NEBEL.